UNITED STATES PATENT OFFICE.

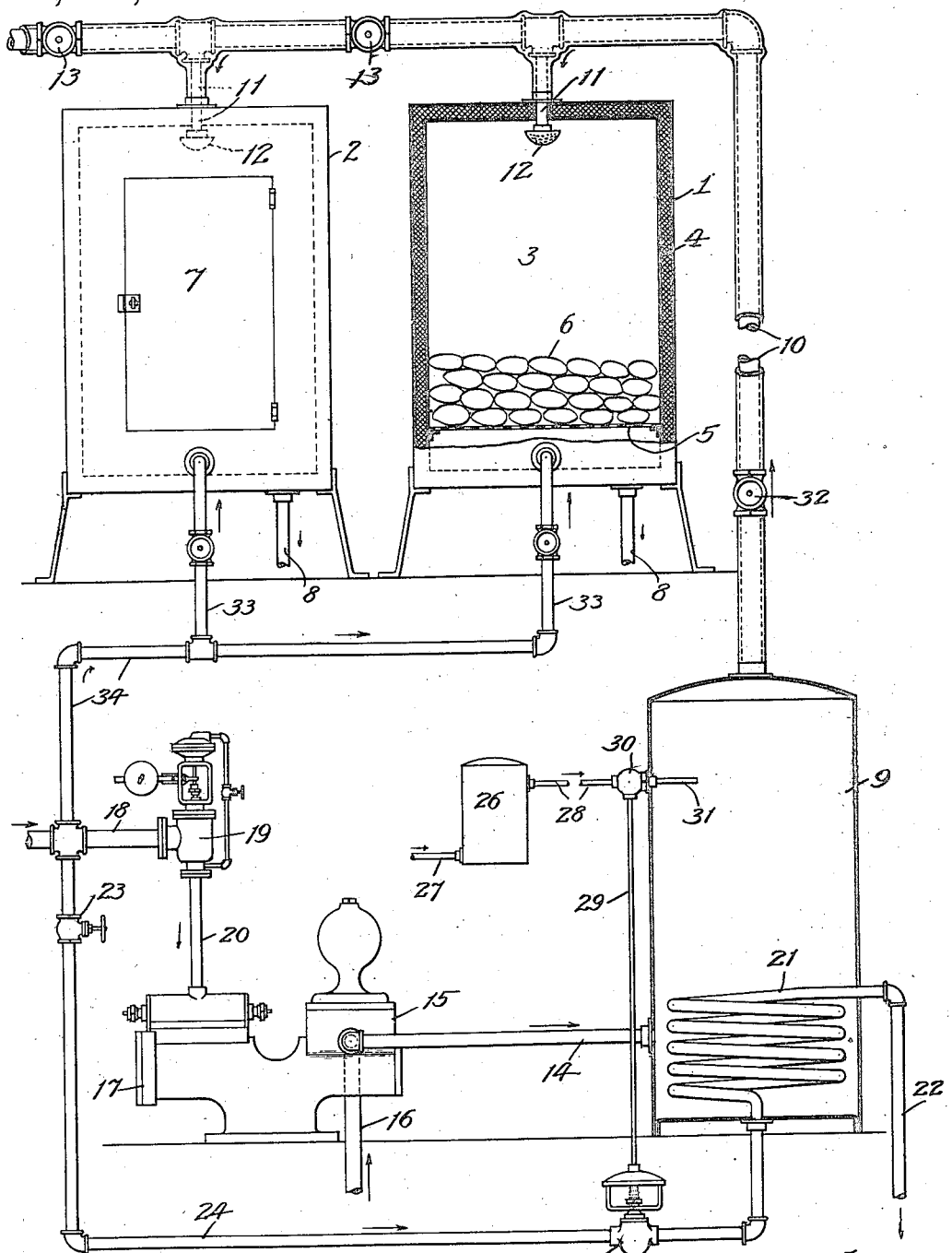

CHARLES B. TRESCOTT, OF CHICAGO, ILLINOIS, ASSIGNOR TO MORRIS & COMPANY, OF CHICAGO, ILLINOIS, A CORPORATION OF MAINE.

ART OF COOKING.

1,214,392.

Specification of Letters Patent.    Patented Jan. 30, 1917.

Application filed June 22, 1916.   Serial No. 105,316.

*To all whom it may concern:*

Be it known that I, CHARLES B. TRESCOTT, a citizen of the United States, residing at Chicago, in the county of Cook and State of Illinois, have invented a new and useful Improvement in the Art of Cooking, of which the following is a specification.

This invention relates to an improvement in the art of low-temperature cooking, in which the temperature employed is below that for boiling water, the maximum for cooking meats being about 180° F. and that for cooking vegetables about 200° F.

The advantage of the low-temperature method of cooking lies, as to meats, in its effect of gradually breaking down the fibrous matter and preventing toughening and hardening of the albumin, besides retaining the natural flavor, which last-named advantage also applies to vegetables cooked by that method. There is, however, a disadvantage in the common practice of low-temperature cooking, namely, that of lack of sufficient heat-units and moisture to thoroughly cook meats and prevent shrinking and drying thereof through evaporation, and that of very imperfectly cooking vegetables.

The object of the present invention is to overcome these and other disadvantages in low-temperature cooking and to enable meats to be cooked thoroughly and properly without shrinking while retaining their juices and natural flavor, and to enable vegetables to be cooked properly without depriving them of their natural flavor. This is accomplished, generally stated, through the medium of water-saturated atmosphere heated to a cooking temperature in a low-temperature cooker, whereby a superfluity of the water is provided to serve as a vehicle for carrying the heat-units, which attack the material undergoing the cooking and gradually effect the cooking thereof with the advantages referred to.

The accompanying drawing illustrates, by a view in elevation partly sectional and diagrammatic in character, an equipment suitable for the practice of the present invention according to a particular procedure found to be most desirable for the purpose.

A series of two cookers, 1 and 2, is shown, though the number may be only one or more than two, as hereinafter more fully explained. The cooker may be of any desired construction, that shown being a double-walled sheet-iron chamber 3 on legs, and, as represented of the cooker 1, with heat-insulating material 4 filling the space between the walls, and a perforate metal shelf 5 in the lower part of the chamber for supporting the matter to be cooked—in the present instance hams, indicated at 6. The cooker-chamber is provided with a door 7 and has an open spout 8 extending from the bottom for leading off surplus water, as to a sewer. A tank or holder 9 for water to be heated in passing through it, has a pipe-connection 10 at its upper end with the top of the chamber 1 at its center, through the medium of a depending branch 11 terminating in a spraying-head 12 inside the chamber. Where two or more cookers are used in series, the pipe 10 forms a header from which a water-spraying branch 11, extends into each chamber, as shown and described of the cooker 1; and shut-off valves, indicated at 13, should then be provided in the header between successive cookers. For feeding the tank continuously with water to be heated, it communicates from near its lower end, through a pipe 14, with a force-pump 15, which takes the water through a pipe 16 from any suitable source of supply.

The pump 15 is driven by a steam-engine 17 of any suitable type which is supplied with live steam from a high-pressure source through a conduit 18 leading to a pressure-reducing valve 19, having a pipe-connection 20 with the engine for actuating the latter by the reduced pressure. For the present purpose the pressure at which water is pumped into the tank 9 need not exceed about 35 lbs.; and by reducing the steam-pressure from the supply-source, through the medium of the valve-device 19, to about 40 lbs. for operating the engine 17, the pump will introduce the water into the tank at a pressure of about 35 lbs., as above suggested, the loss being due principally to friction. Under this pressure the water discharges from the tank through each spraying-head 12 into the upper end of the respective cooker-chamber, and is sprayed into the initially cold atmosphere therein to saturate it. This atmosphere must be heated to the predetermined cooking temperature (about 140° to 145° F. for cooking hams, or about 200°

F. for cooking vegetables), and to that end the water is heated in the tank through the medium of a steam-coil 21 contained therein, shown to discharge through a pipe 22, as to a sewer, and to receive its supply of steam through a pipe 24 leading into it from the conduit 18 through the tank-bottom and containing a shut-off valve, indicated at 23. For automatically controlling the temperature of the water in the tank 9, to maintain desirable uniformity thereof for the cooking purpose, the pipe 24 is equipped with a diaphragm-operated valve-device, indicated at 25, to be controlled by compressed air from a holder 26 communicating through a pipe 27 with a source of air-pressure supply, and discharging through a pipe 28 into a pipe 29 leading into the diaphragm-chamber of the valve-device 25; communication of the pipes 28 and 29 with each other being controlled by a needle-valve device 30, operated by a thermostat 31 in the upper part of the tank.

To practice the improved process for cooking hams, in a chamber 3 of the apparatus thus described, the hams are introduced into the cooker through its opened door 7 and piled on the shelf 5. With the water under pressure in the tank 9 and heated to the required temperature by the steam-heated coil 21,—say to about 150° F.—upon opening a valve 32 in the pipe 10 the hot water will be showered in a fine spray into the cooker 1, supposing that to be the only cooker in use. The temperature for the low-temperature cooking of hams is about 140° to 145° F. and is that of the water, at 150° F. in the tank on entering the cooker; though the pipe 10 and its branches 5 should be insulated to prevent undue cooling of the water in its course to the cooker-chamber. The hot water which is continuously sprayed into the upper end of the chamber 3, is sufficiently copious to saturate the atmosphere therein and heat it to the degree required for the low-temperature cooking purpose and affords a vehicle for carrying the heat-units to and causing them to act uniformly on the meat. The surplus hot water discharges through the outlet-pipe 8.

The importance of providing the superfluity of hot water in a finely divided condition for saturating the atmosphere therewith, besides that of heating the atmosphere, which is at normal pressure in the chamber, to the requisite cooking temperature, lies in affording an augmented vehicle for carrying the heat-units to the material undergoing cooking, whereby the latter is cooked to a mellow condition uniformly throughout under the comparatively low-temperature, and this with comparative rapidity because of the large number of heat-units.

If one or more cookers be provided in addition to the cooker 1, as each is brought into use the respective valve 13 is opened and kept open until the operation in the added cooker is completed. The meat, such as hams 6, when introduced into a chamber 3, is usually quite cold, and in that condition tends to retard the cooking action therein of the water-heated and saturated air. To avoid such retardation, each cooker has leading into its bottom a valved branch 33 of a steam-pipe 34 branching from the steam-supply conduit 18, whereby live steam may be introduced into the cooker-chamber to warm the cold meat and quickly bring the chamber up to the cooking temperature. Furthermore, as each additional cooker is brought into commission the water from the tank 9 may, unless prevented, discharge faster than it becomes heated to the predetermined temperature for effecting the cooking. The thermostat prevents that, since if the heat of the tank-water lowers below the predetermined degree, it actuates the thermostat to open the valve 25 farther and increase the admission of steam to the coil 21 to quickly raise the temperature of the flowing tank-water to that predetermined. Even with a single cooker in the system, however, the thermostat is useful in automatically shutting off and opening the valve 25, as required, to maintain a uniform temperature of the cooker-atmosphere heating and saturating water.

Hams and other meats cooked in accordance with the herein described process are thoroughly and uniformly cooked throughout and extremely tender, retaining their natural flavor and also their full weight, less the juices which exude, since there is no evaporation into the already water-saturated atmosphere in the cooker-chamber; and vegetables may be thoroughly cooked in the same manner and will retain in the cooking their natural flavor.

The present process is to be distinguished from one employing steam sprayed into an oven during cooking, for where steam is so used it is impossible, because of the high degree of its temperature, to maintain the requisite degree of heat for low-temperature cooking and at the same time attain requisite saturation of the hot-air in the cooker-chamber, since where the supply of steam is sufficiently copious to moisten and heat the air, it overheats the chamber and thus defeats the very object of low-temperature cooking; and if the quantity is made insufficient to so overheat the chamber, it will fail to saturate the air therein.

What I claim as new and desire to secure by Letters Patent is:

1. In the art of low-temperature cooking, the process of subjecting the material to be cooked in a cooker-chamber to the influence of water-saturated hot air at atmospheric pressure in said chamber and at a cooking temperature below the boiling point of water, and continuously supplying from an extraneous source throughout the cooking operation such air-saturating water.

2. In the art of low-temperature cooking, the process of spraying into a cooker, in which the cooking is carried on, hot water of a temperature below 212° F. and thereby saturating with water the atmosphere in the cooker and heating said atmosphere to the cooking temperature, and maintaining a continuous supply of the atmosphere saturating and heating sprayed hot-water, throughout the cooking operation.

3. In the art of low-temperature cooking, the process of spraying into a cooker, in which the cooking is carried on, hot water of a temperature below 212° F. and thereby saturating with water the atmosphere in the cooker and heating said atmosphere to the cooking temperature, maintaining a continuous supply of the atmosphere saturating and heating sprayed hot water throughout the cooking operation, and withdrawing the surplus hot water from the cooker throughout said operation.

4. In the art of low-temperature cooking, the process of forcing water under pressure through a water-supply holder and heating it, in its passage therethrough, to a temperature predetermined for cooking, but below the boiling-point of water and continuously directing the heated water and spraying it into a cooker in which the cooking is carried on, thereby saturating with water the atmosphere in the cooker and heating said atmosphere to the predetermined cooking temperature.

5. In the art of low-temperature cooking, the process of forcing water under pressure through a water-supply holder and heating it, in its passage therethrough, to a temperature predetermined for cooking but below the boiling-point of water, continuously directing the heated water and spraying it into a cooker in which the cooking is carried on, thereby saturating with water the atmosphere in the cooker and heating said atmosphere to the predetermined-cooking temperature, and automatically controlling the heating of the water coursing through said holder to maintain the predetermined temperature thereof.

CHARLES B. TRESCOTT.